(12) United States Patent
Pitcher

(10) Patent No.: US 11,465,076 B2
(45) Date of Patent: *Oct. 11, 2022

(54) AUTOMATED SAND SEPARATOR DISCHARGE SYSTEM

(71) Applicant: Batfer investment S.A., Montevideo (UY)

(72) Inventor: Jason Pitcher, Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/546,286

(22) Filed: Dec. 9, 2021

(65) Prior Publication Data

US 2022/0096966 A1    Mar. 31, 2022

Related U.S. Application Data

(63) Continuation-in-part of application No. 16/984,976, filed on Aug. 4, 2020, now Pat. No. 11,213,768.

(60) Provisional application No. 63/002,040, filed on Mar. 30, 2020.

(51) Int. Cl.
| | |
|---|---|
| *B01D 21/24* | (2006.01) |
| *B01D 21/34* | (2006.01) |
| *B01D 21/30* | (2006.01) |

(52) U.S. Cl.
CPC ......... *B01D 21/245* (2013.01); *B01D 21/302* (2013.01); *B01D 21/34* (2013.01)

(58) Field of Classification Search
None
See application file for complete search history.

(56) References Cited

U.S. PATENT DOCUMENTS

| | | | |
|---|---|---|---|
| 6,790,367 B2 | 9/2004 | Schmigel et al. | |
| 9,616,431 B2 | 4/2017 | Lyon et al. | |
| 9,803,459 B1 | 10/2017 | Leal | |
| 11,213,768 B2 * | 1/2022 | Pitcher | B01D 21/34 |
| 2014/0345727 A1 | 11/2014 | Gilmore et al. | |
| 2019/0118118 A1 | 4/2019 | Sehsah et al. | |
| 2021/0077923 A1 | 3/2021 | Carlson et al. | |
| 2021/0252431 A1 | 8/2021 | Malone et al. | |

* cited by examiner

*Primary Examiner* — Richard C Gurtowski
(74) *Attorney, Agent, or Firm* — Bushman Werner, P.C.

(57) ABSTRACT

A system for automatically discharging sand from a sand separator. The system includes a first and second valves and a choke valve disposed in a discharge line from a sand separator. A pressure transducer measures pressure in the line between the first and second valves. A controller operates the valves to initiate and terminate the discharge sequence. An emergency shutdown valve is positioned upstream of the sand separator and is operative to shut down the system if the pressure reading by the transducer exceeds a predetermined amount.

7 Claims, 1 Drawing Sheet

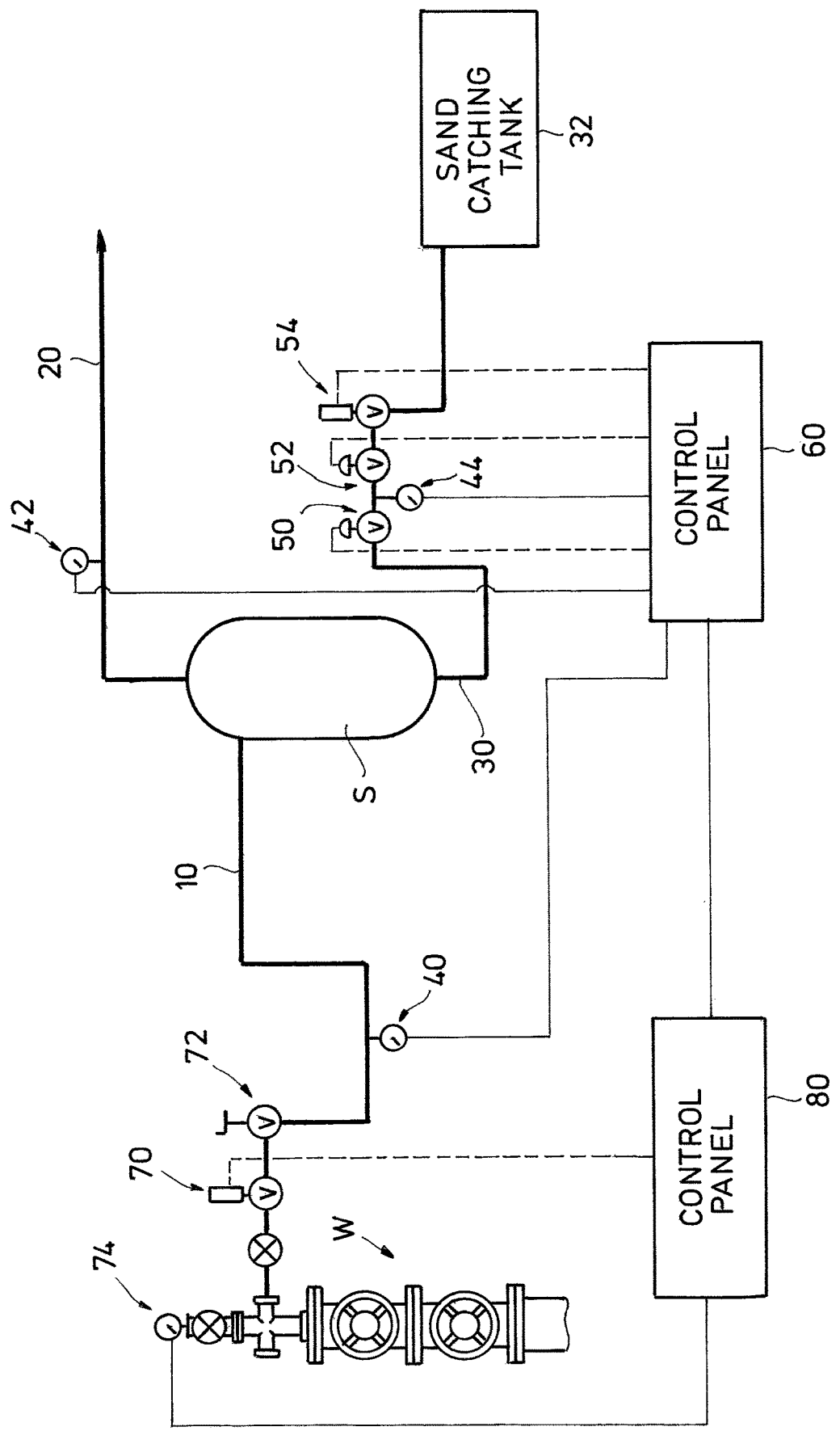

AUTOMATED SAND SEPARATOR DISCHARGE SYSTEM

CROSS REFERENCE TO RELATED APPLICATION

This application is a continuation-in-part of U.S. application Ser. No. 16/984,976 filed Aug. 4, 2020, which in turn claims priority to U.S. Application No. 63/002,040 filed on Mar. 30, 2020, the disclosures of which are incorporated herein by reference for all purposes.

FIELD OF THE INVENTION

The present invention relates to an automated discharge system for a sand separator positioned downstream of an oil or gas wellhead.

BACKGROUND OF THE INVENTION

Sand separators (also known as sand traps and sand catches) are often the first piece of equipment downstream of an oil or gas wellhead. A sand separator captures sand and sediment from the production stream to protect further downstream equipment from plugging and erosion. In a typical sand separator, the sand and sediment are separated using deflectors, impingement plates or baffles, and gravity. The plates/baffles keep sand and sediment separated at the bottom of the vessel, while allowing gas and liquids to flow at the top. The liquids and gas are carried through an upper outlet line for further downstream processing and the sand/sediment is periodically discharged from the bottom of the separator.

SUMMARY OF THE INVENTION

In one aspect, the present invention relates to an automated discharge system for a sand separator.

In another aspect, the present invention relates to a sand separator discharge system which can be triggered by a remote command, in response to a sand level sensor, or on an automated schedule.

In yet another aspect, the present invention relates to a sand separator discharge system in which the integrity of the valves can be automatically verified and, if valve integrity has been compromised, shut the system down.

These and further features and advantages of the present invention will become apparent from the following detailed description, wherein reference is made to the figures in the accompanying drawings.

BRIEF DESCRIPTION OF THE DRAWINGS

FIG. 1 depicts one embodiment of the system of the present invention.

DETAILED DESCRIPTION OF PREFERRED EMBODIMENTS

As used herein the term "sand" refers to sand, sediment, or other solid particulates which are undesirable in a stream produced from an oil or gas wellhead. It will thus be understood that the term "sand" is not limited to actual sand only.

FIG. 1 depicts one embodiment of the system of the present invention. The system comprises a sand separator S connected to a wellhead W by line 10. Sand separator S can be of any type well known to those skilled in the art. As with most typical sand separator systems, a stream from wellhead W, enters separator S wherein the sand is separated from the stream. The lighter liquids and gas portions of the stream leaves separator S overhead via line 20 for further processing. A slurry of sand, water, heavier liquids, etc. is removed from the bottom of separator S via line 30 and sent to a sand catching tank 32.

Transducers 40, 42, and 44 measure pressure in lines 10, 20, and 30, respectively, and generate signals indicative thereof. The purpose of transducers 40, 42, and 44 will be explained more fully later.

Valves 50 and 52 are positioned on either side of transducer 44 in line 30. In a preferred embodiment, choke valve 54 is downstream of valve 52 but upstream of sand catching tank 32. It will be understood that the present invention may also work in systems which do not employ a choke valve. In the embodiments shown herein, choke valve 54 is designed to be either fully open or fully closed and is the primary wear element of the system of the present invention. It will be appreciated that valves 50 and 52 can be of any hydraulically or pneumatically actuated type. Such valves can include, but are not limited to, plug valves, ball valves, gate valves, etc. In a preferred embodiment, valves 50 and 52 are plug valves. Choke valve 54 can also be of any type provided it is a choke valve. In a preferred embodiment, choke valve 54 is a hydraulically actuated, spring return choke valve, which fails open.

Controller 60 receives data from transducers 40, 42, and 44 and thus monitors inlet pressure of sand separator S via transducer 40, outlet pressure via transducer 42, and the pressure between valves 50 and 52 via transducer 44. It is critical to ensure pressure integrity is maintained in line 30. This is achieved by monitoring the line between valves 50 and 52.

Controller 60 is operatively connected to valves 50 and 52, and to choke valve 54. In a preferred embodiment, controller 60 is an electric over hydraulic controller.

Sand discharge sequences using the system of the present invention proceed as shown below. In these embodiments all the valves all being controlled by controller 60.

Sand Discharge Sequence Option 1
    prior to discharging sand from separator S, valves 50, 52, and 54 are all closed
    check that the pressure in transducer 44 is zero
    open valve 50
    check the pressure reading of transducer 44 which indicates the pressure in the separator
    open valve 52
    open choke valve 54 for a predetermined amount of time X
    when time X has elapsed, terminate the sand discharge sequence Sand Discharge Sequence Option 2
    prior to discharging sand from separator S, valves 50, 52, and 54 are all closed
    check that the pressure in transducer 44 is zero
    open valve 50
    check the pressure reading of transducer 44 which indicates the pressure in the separator
    open valve 52
    open choke valve 54
    monitor the pressure in transducer 40 and/or transducer 44
    if either transducer 40 or 44 indicates a drop in pressure, terminate the sand discharge sequence The termination of the sand discharge sequence is shown below. Again, in this embodiment, all the valves are being controlled by controller 60.

Termination of Sand Discharge Sequence
    close choke valve 54
    close valve 50
    check the pressure reading of transducer 44
        if the pressure reading is zero, close valve 52
        if the pressure reading is not zero, open choke valve 54 again
            when the pressure reading of transducer 44 reaches zero, close valve 52
            close choke valve 54

In Sand Discharge Sequence Option 1, the predetermined amount of time X for which choke valve 54 is open will be determined by the operator or other personnel, and will be based on the particular sand separator to allow sufficient time to sufficiently discharge the sand separator S into the sand catching tank 32. It is generally desirable to leave some amount of sand in the bottom of sand separator S to ensure the liquids in sand separator S are not unintentionally discharged through line 30 as well.

In Sand Discharge Sequence Option 2, the pressure in the inlet line 10 and/or the discharge line 30 is monitored. If all of the heavier slurry of sand has been discharged and the lighter gas is starting to exit the sand separator (known as gas breakthrough), there will be a drop in pressure in these lines. This pressure drop indicates that the sand discharge sequence should be terminated.

It will be appreciated that Sand Discharge Sequence Option 2 can be used to calculate the predetermined time X used in Sand Discharge Sequence Option 1. In this regard, a discharge sequence is initiated and the amount of time before a gas breakthrough occurs can be determined (time X). Controller 60 can then be programmed to terminate further sand discharge sequences when time X has elapsed or shortly before. This will help prevent the undesired discharge of gas through the sand separator line.

The system of the present invention can be programed to initiate the discharge sequence in response to a timer (e.g., discharge every 240 minutes), a clock (e.g., discharge at 17:00 hours every day), or a sand level sensor operatively connected to sand separator S. The discharge sequence can also be initiated through a manual override.

Upstream of the sand separator S is a wing section comprising an emergency shutdown (ESD) valve 70 and a choke 72. In a preferred embodiment ESD valve 70 is a hydraulically actuated valve. Controller 80 is connected to ESD valve 70 and allows for remote control of the well and provides a safety interlock for sand separator S. Transducer 74 is connected to wellhead W and sends signals to controller 80. In the event that transducer 74 detects pressure above a certain threshold in wellhead W, controller 80 will activate ESD valve 70 to shut down the system. Controllers 60 and 80 are also in communication with one another. If a differential pressure which exceeds a predetermined limit is detected between the inlet line 10 and outlet line 20, Controller 60 will send a shutdown signal to controller 80 which will activate ESD valve 70 to shut down the system.

Further, if valve 50 is closed and the pressure reading by transducer 44 is not zero after evacuating to atmosphere and closing valve 52, this indicates valve 50 has lost seal integrity and the system is shut down by ESD valve 70 to prevent failure of valve 52 as well.

While FIG. 1 depicts two separate controllers, 60 and 80, it will be understood that this is only one possible configuration and that control of the system of the present invention could be handled by a single controller, or more than two controllers.

In addition to automatically discharging the sand from sand separator S, the present invention can automatically verify the integrity of the automated valves 50 and/or 52. The present invention employs two automated valves 50 and 52 downstream of the sand separator S with pressure transducer 44 between. To verify integrity of valve 52, the system traps pressure between the valves 50 and 52 and opens the choke to atmospheric pressure. The system monitors the pressure between the valves and if it decreases, it indicates that valve 52 has a compromised seal, and the system activates ESD valve 70 upstream of the sand separator to prevent the uncontrolled release of hydrocarbons through discharge line 30. The system tests the integrity of valve 50 by venting the space between the valves to atmosphere, then sealing the inter-valve space. The pressure is monitored with transducer 44 for an increase in pressure. If the pressure increases above atmospheric pressure, the seal integrity of valve 50 is compromised and again the system shuts down valve 70 and thus the feed to separator S. It will be understood by those skilled in the art that the integrity of the choke valve 54 is not verified because choke valve 54 is designed to wear. The system of the present invention can be programmed to automatically run valve integrity checks after a desired number of sand discharge sequences or after a specified amount of time. The valve integrity check can also be initiated by an operator at any time between the programmed integrity checks.

The system of the present invention provides advantages over the prior art. For example, the system of US 2014/0345727, incorporated herein by reference for all purposes, uses a single automated valve downstream of the sand trap, and measures the pressure of the lines upstream and downstream of the sand trap. If the pressures are outside the appropriate ranges, an alarm is triggered. However, the exact nature of what triggered the alarm cannot be determined. Additionally, the system of US 2014/0345727 and others which only use one valve downstream of the separator cannot automatically verify the integrity of the valve.

The system of the present invention thus automates the sand discharge system, reduces maintenance costs by verifying seal integrity, and improves safety by performing the processes automatically and by automatically shutting the system down when needed.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:
1. A method of discharging sand from a sand separator, comprising:
    providing a sand separator disposed downstream of a wellhead, said sand separator having an inlet for receiving a process stream from said wellhead, a fluid outlet for removing a liquid and gas stream from said sand separator, and a sand discharge outlet for removing sand from said sand separator;

providing first and second valves positioned in a line from said sand discharge outlet;

providing a first pressure transducer connected to said sand discharge line between said first and second valves, said pressure transducer being operative to generate a signal indicative of pressure between said first and second valves;

providing a controller operatively connected to said first and second valves, and said first pressure transducer;

initiating discharge of sand from said sand separator;

opening said first valve;

opening said second valve;

monitoring the pressure in said first transducer;

terminating discharge of said sand when said first transducer indicates a drop in pressure.

2. The method of claim 1, further comprising:

measuring the amount of elapsed time between the initiation of said discharge of sand and a first indication by said first transducer of a pressure drop to determine a gas breakthrough time.

3. The method of claim 2, further comprising:

terminating discharge of said sand when or before the gas breakthrough time has elapsed.

4. The method of claim 1, further comprising:

providing a second transducer operatively connected to said inlet and operative to measure pressure in said process stream.

5. The method of claim 4, further comprising:

monitoring pressure of both said first and second transducers and terminating discharge of said sand when either said first or second transducer indicates a drop in pressure.

6. A method, comprising:

providing a sand separator disposed downstream of a wellhead, said sand separator having an inlet for receiving a process stream from said wellhead, a fluid outlet for removing a liquid and gas stream from said sand separator, a sand discharge outlet for removing sand from said sand separator;

providing first and second valves positioned in a discharge line from said sand discharge outlet;

providing a first pressure transducer connected to said sand discharge line between said first and second valves, said transducer being operative to generate a signal indicative of pressure between said first and second valves;

a controller operatively connected to said first and second valves, and said first transducer;

initiating discharge of sand from said sand separator;

opening said first valve;

opening said second valve;

terminating discharge of said sand when a predetermined amount of time has elapsed;

initiating a seal integrity check of at least one of said first and second valves.

7. An automated sand separator discharge system, comprising:

a sand separator disposed downstream of a wellhead;

an inlet for receiving a process stream from said wellhead;

a fluid outlet for removing a liquid and gas stream from said sand separator;

a sand discharge outlet for removing sand from said sand separator;

first and second valves positioned in a discharge line from said sand discharge outlet;

a first pressure transducer connected to said sand discharge line between said first and second valves, said pressure transducer being operative to generate a signal indicative of pressure between said first and second valves;

a controller operatively connected to said first and second valves, and said first transducer, said controller being programmed to initiate and terminate the discharge of sand from said sand separator, and said controller also being programmed to periodically perform individual seal integrity checks of at least one of said first and second valves.

* * * * *